United States Patent [19]
Ackerson

[11] Patent Number: 5,603,751
[45] Date of Patent: Feb. 18, 1997

[54] METHOD AND APPARATUS FOR REMOVING PARTICULATE MATERIAL FROM A WOOD DRYING SYSTEM

[75] Inventor: Ross A. Ackerson, Lee's Summit, Mo.

[73] Assignee: Mac Equipment, Inc., Sabetha, Kans.

[21] Appl. No.: 458,972

[22] Filed: Jun. 2, 1995

[51] Int. Cl.$^6$ ................................................ B01D 50/00
[52] U.S. Cl. ................................. 95/268; 34/82; 34/480; 55/267; 55/327; 55/337; 55/338; 55/385.1; 95/283; 95/288
[58] Field of Search ............................ 95/268, 273, 283, 95/288, 291; 55/261, 267, 327, 334, 337, 338, 341.1, 385.1; 34/79, 82, 480

[56] References Cited

U.S. PATENT DOCUMENTS

| | | | |
|---|---|---|---|
| 4,218,832 | 8/1980 | Daniels | 34/79 |
| 4,339,883 | 7/1982 | Waldmann | 34/79 |
| 4,431,405 | 2/1984 | Eatherton | 95/274 |
| 4,759,777 | 7/1988 | Balakrishan et al. | 95/152 |
| 4,771,708 | 9/1988 | Douglass, Jr. | 34/79 |
| 4,888,884 | 12/1989 | Bartling et al. | 34/82 |
| 4,964,885 | 10/1990 | Wieser-Linhart | 95/189 |
| 5,237,757 | 8/1993 | Wiedmann et al. | 34/79 |
| 5,263,266 | 11/1993 | Schmidt | 34/79 |
| 5,271,162 | 12/1993 | Kunz et al. | 34/79 |

FOREIGN PATENT DOCUMENTS

| | | | |
|---|---|---|---|
| 409034 | 1/1991 | European Pat. Off. | 95/268 |

Primary Examiner—Jay H. Woo
Assistant Examiner—Duane S. Smith
Attorney, Agent, or Firm—Kokjer, Kircher, Bowman & Johnson

[57] ABSTRACT

A gas filtration system which includes a primary separator for removing a majority of a particulate material from a gas stream. The primary separator discharges a filtered gas stream which retains a portion of the particulate material. The filtered gas stream from the primary separator is delivered to a secondary particulate source which introduces additional particulate material into the filtered gas stream to produce a conditioned gas stream containing primary and secondary particulate material. The output of the secondary particulate source is delivered to a secondary filter which removes the primary and secondary particulate material from the conditioned gas stream to output the resulting gas stream, substantially void of particulate material. The conditioned gas stream contains a minimum amount of particulate material necessary to achieve optimal efficiency and operating life within the secondary separator. Optionally, the conditioned gas stream may be further conditioned by heating same to a predefined temperature to avoid condensation of gaseous compounds and liquid vapor, in the gas stream, within the secondary separator. Optionally, a thermal oxidizer may be added to remove VOCs from the resulting gas stream.

8 Claims, 2 Drawing Sheets

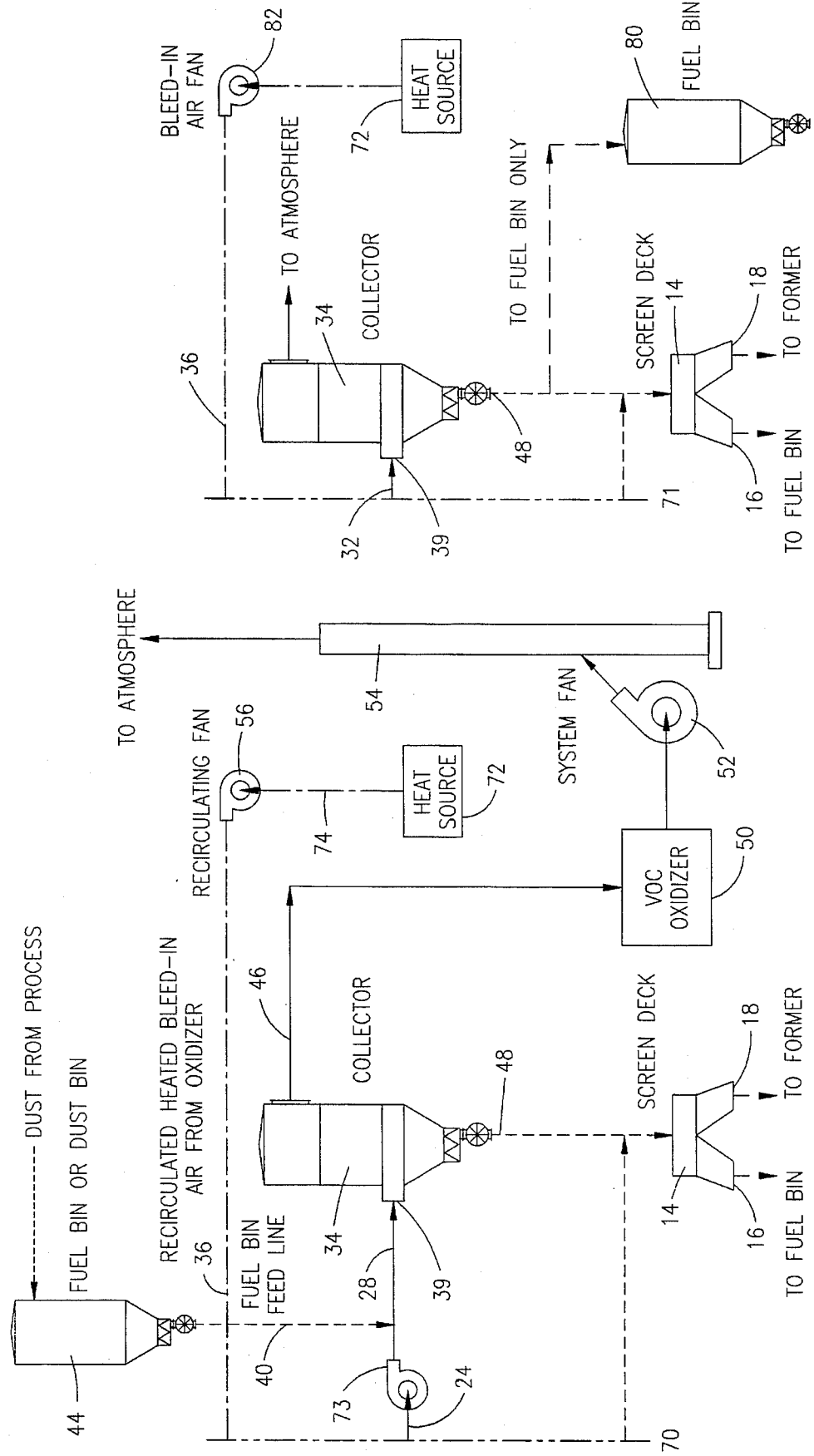

METHOD AND APPARATUS FOR REMOVING PARTICULATE MATERIAL FROM A WOOD DRYING SYSTEM

BACKGROUND OF THE INVENTION

1. Field of the Invention

The present invention generally relates to a filtration system for removing particulate material from a gas stream, and in particular, to a filtration system which conditions the gas stream at an intermediate point along the filtration process to better enable downstream removal of particulate material.

2. Background of the Invention

In the past, systems have been proposed for removing particulate material from an air stream during a manufacturing process. One such environment exists in the wood manufacturing industry wherein particle board, medium-density fiber board, oriented strand board and the like are formed. To produce these wood products, wood chips and wood particles are combined to form a solid panel. During the manufacturing process, the wood particles and chips are passed through a dryer which removes moisture therefrom. Once dried, the wood chips and particles are conveyed, such as within a pneumatic conveyor, to a former and press which cooperate to compress the wood particles and chips into a desired end product, such as a board, panel, or sheet. Additionally, in the wood manufacturing industry, the dryer discharges several gaseous compounds, such as the moisture removed from the wooden particles and chips, gaseous tar, terpenes and the like. Examples of these gaseous compounds include beta pinene, limonine, camphene, alpha pinene, and the like (hereafter collectively referred to as terpenes).

As is known in the industry, the raw material (i.e., the wood particles and chips) may be delivered to and removed from the dryer via pneumatic conveyors. However, the raw material may not be delivered directly to the forming process via a pneumatic conveyor. Instead, the raw material must be removed from the air stream within which it is entrained during the conveyance process, prior to being delivered to the forming process.

Conventional systems utilize particulate separators, such as cyclones, to remove the entrained raw material from the air stream and to deliver the raw material to the forming process, while exhausting the air stream to the atmosphere. The gaseous compounds and the liquid vapor discharged from the dryer are similarly discharged within the gas stream output from the separator. However, the separators used within conventional systems are less than 100% efficient and thus discharge a percentage of the raw material into the atmosphere. Such discharge is undesirable as it wastes raw material and damages the environment.

It should be understood that the term "separator", as used throughout this application, is intended to refer to any conventional separation device, known within the industry, to remove particulate material from the gas stream emitted from a wood dryer. These separation devices remove approximately 80–95% of the wood particulate material from the gas stream.

In the past, a secondary particulate removal device has been provided downstream of the primary separator to further remove particulate material from the gas stream. However, these secondary removal devices, such as multi-clones, still leave an undesirable percentage of the wood particulate material within the gas stream. In some instances, a thermal oxidizer has also been included downstream of the conventional secondary removal devices to remove the VOCs from the gas stream. However, in order for the thermal oxidizer to remove VOCs effectively, it must receive a gas stream substantially void of particulate material. Hence, conventional systems have been unable to effectively use thermal oxidizers since such systems have been unable to remove substantially all of the particulate material from the gas stream.

The conventional secondary particulate removal devices have been limited to the types of devices, such as multi-clones, which leave approximately 5% of the wood material within the gas stream. More efficient removal devices have proven ineffective within the wood drying industry. For instance, fabric type particle collectors have proven ineffective when installed upstream of the thermal oxidizer since the fabric type particle collector blinds and plugs with the particulate material. The particulate material blinds and plugs the fabric due, in part, to the presence of the gaseous compounds and the liquid vapor discharged from the dryer. Once discharged from the dryer, the gaseous compounds and liquid vapor begin to cool as they are transferred through the equipment and along the ductwork. Such cooling continues until reaching a temperature corresponding to the dew point of the compound and liquid. When the temperature reaches the dew point, the compounds and liquid vapor condense. Typically, this condensation occurs upon the filter media within the fabric collector. As the particulate material contacts the condensation, it blinds and plugs the filter.

Additional inefficiencies of a fabric collector type separator result in conventional wood filtration systems due to the low percentage of particulate material entrained within the gas stream delivered to the collector. Approximately 90% of the particulate content of the incoming air stream is removed in the primary separator. The remaining percentage of particulate material is too small to enable the fabric collector to establish a consistent "dust cake" about the exterior of the filter media. The term "dust cake" is a term of art which refers to the phenomenon whereby filtered particulate material forms a collective layer about the fabric media (such as a filter bag within a baghouse). The collective layer protects the filter media from blinding over or plugging. The dust cake increases the filtration efficiency of the filter media. However, the above-noted fabric-type collectors have proven ineffective when used with a wood dryer, since insufficient dust is present to form a dust cake. Moreover, the condensation, within the collector, of vapor and gaseous compounds has further interfered with the formation of a dust cake upon the fabric media.

An alternative secondary collection system has been proposed which utilizes a wet filter wherein the gas stream is passed through a chamber containing liquid. The particulate material collects within the liquid and is removed from the air stream. However, such wet filtration systems produce a slurry byproduct of liquid and particulate material which is environmentally disadvantageous. Also, such wet type filtration equipment is overly expensive to achieve the desired filtration efficiencies and volume capabilities.

A need remains within the industry for an improved filtration system for use with wood dryers. It is an object of the present invention to meet this need.

SUMMARY OF THE INVENTION

It is an object of the present invention to provide a system capable of removing at least 99% of the particulate material from a gas stream containing wood type particulate material, vapor, and gaseous compounds.

It is a further object of the present invention to provide a filtration system which preconditions a gas stream prior to final filtration to enhance the filtering efficiency and to increase the equipment life.

It is a corollary object of the present invention to provide a filtration system for use within the wood industry which is capable of using common filter media to remove particulate material from a gas stream discharged from a wood dryer.

It is a further corollary object of the present invention to increase the useful life of a thermal oxidizer used within a wood processing plant to filter VOCs from a gas stream emitted from a wood dryer by minimizing the amount of particulate material delivered to the oxidizer.

It is an additional object of the present invention to eliminate the handling and disposal of wet filtration dust discharge collected from a gas stream emitted from a wood dryer.

It is another object of the present invention to simplify the filtration equipment used in cooperation with wood dryers.

It is a corollary object to lower the operating cost of the filtration system as compared with the cost necessary to operate a liquid filtration system.

These and other objects are achieved by providing a gas filtration system which includes a primary separator for removing a majority of a particulate material from a gas stream. The primary separator discharges a filtered gas stream which retains a portion of the particulate material. The filtered gas stream from the primary separator is delivered to a secondary particulate source which introduces additional particulate material (similar to the primary particulate material) into the filtered gas stream to produce a conditioned gas stream containing primary and secondary particulate material. The output of the secondary particulate source is delivered to a secondary filter which removes the primary and secondary particulate material from the conditioned gas stream to output the resulting gas stream, substantially void of particulate material. The conditioned gas stream contains a minimum amount of particulate material necessary to achieve optimal efficiency and operating life within the secondary separator. Optionally, the conditioned gas stream may be further conditioned by heating same to a predefined temperature to avoid condensation suspended in the secondary separator of gaseous compounds and liquid vapor within the gas stream. Optionally, a thermal oxidizer may be added to remove VOCs from the resulting gas stream.

BRIEF DESCRIPTION OF THE DRAWINGS

The objects and features of the invention noted above are explained in more detail with reference to the drawings, in which like reference numerals denote like elements, and in which:

FIG. 2 illustrates an alternative embodiment for a downstream portion of the present invention illustrated in FIG. 1; and FIG. 3 illustrates a third embodiment for the present invention.

DETAILED DESCRIPTION OF THE INVENTION

Figure 1:
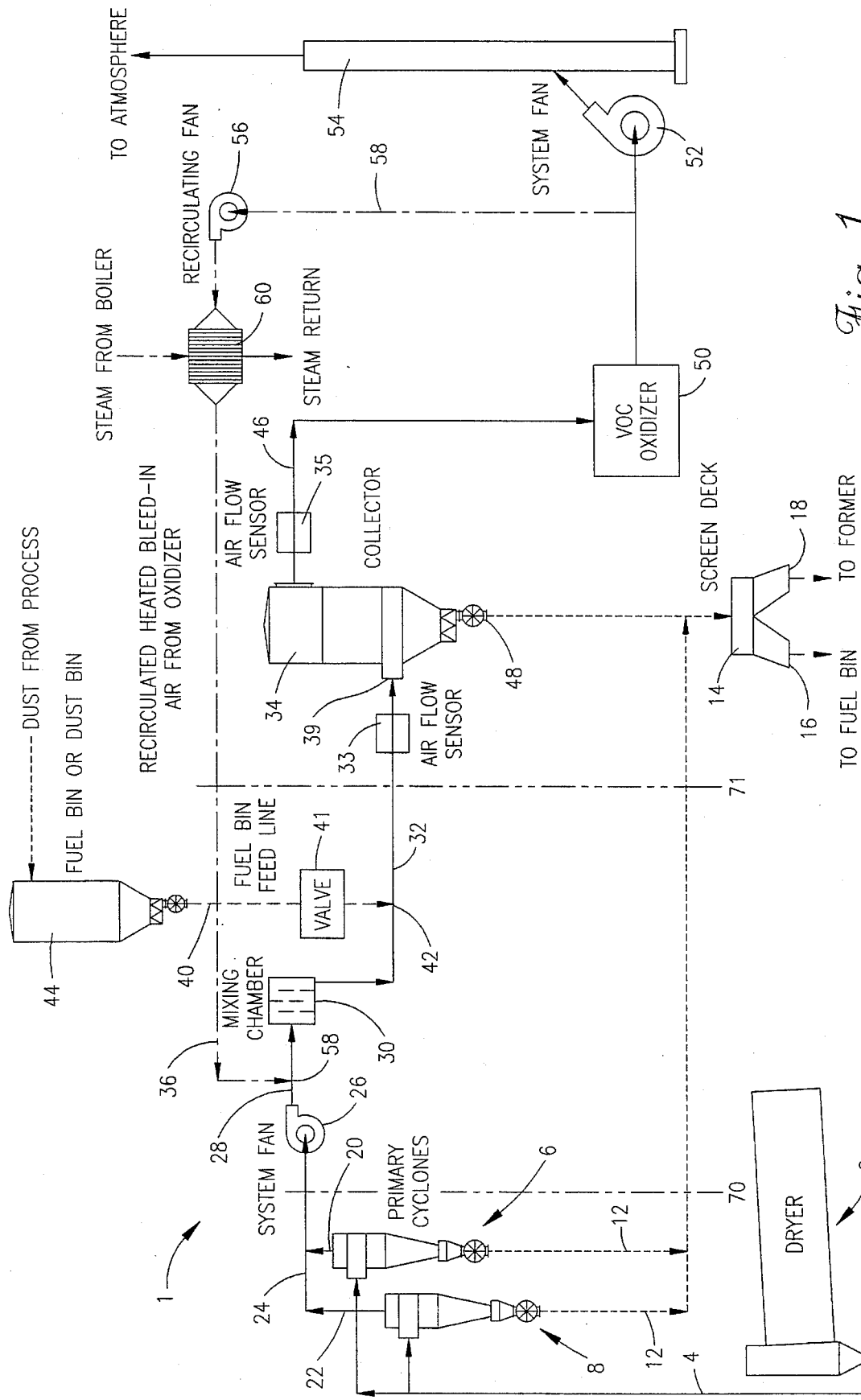
FIG. 1 illustrates a first embodiment of the present invention in block diagram form.

FIG. 1 illustrates a schematic view of one embodiment of the present invention. FIG. 1 illustrates a particulate removal system generally designated by the reference numeral 1. The system is located downstream of a wood dryer 2, such as a rotary dryer or flash tube type dryer and the like. The dryer 2 heats the wood particles and wood chips to remove moisture therefrom. The dried wood particles and chips are discharged from the drier into a conveyance line 4, such as a pneumatic conveyor tube and the like. The dryer 2 further discharges, into the line 4, gaseous compounds, such as tar and terpenes and the like, and the liquid vapor driven from the dried wood product. The wood particulates, chips, gaseous compounds, and liquid vapor are delivered along the conveyance line 4 to primary separators 6 and 8 which remove the wood chips and a majority of the wood particulates from the pneumatic conveyance stream. The separated wood chips and particulates are discharged along lines 10 and 12 from the separators and delivered to a screen deck 14. The screen deck 14 separates smaller particulate material from the wood chips and larger wood material. The smaller screened particulate material is supplied at point 16 to a fuel or dust bin and thereafter used as fuel dust to charge the various processing equipment (as is known in the industry), or disposed. The larger wood chips are delivered at point 18 to a former apparatus (not shown) which compresses the wood chip material into a finished product. In some instances, the dried wood fiber is delivered straight to the former apparatus, by-passing any screening operations.

Returning to the primary separators 6 and 8, a filtered gas stream is discharged from each separator at points 20 and 22 and delivered via a conveyance pipe 24 to a fan 26. The primary separators 6 and 8 remove a substantial majority of the particulate material from the gas stream. In general, the separators 6 and 8 remove approximately 80–95% of the particulate material from the gas stream to provide a filtered gas stream which is delivered to the fan 26. The fan 26 conveys the filtered gas stream along line 28 to a mixing chamber 30 and thereafter to a secondary filter 34 via a line 32. The mixing chamber 30 functions to thoroughly mix the filtered gas stream within line 28 with a heated gas stream delivered via line 36. The heated gas stream is added to the filtered gas stream at point 38 for reasons explained below.

In addition, the system includes a secondary inlet line 40 which delivers secondary particulate material at point 42 to the conveyance line 32 upstream of the secondary filter 34. The secondary inlet line 40 delivers the secondary particulate material from a remote fuel or dust bin 44, optionally, which may receive dust from the wood processing plant. A valve 41 controls the rate at which the secondary particulate material is delivered to the line 32.

The secondary filter 34 removes a substantial majority (minimum 99%) of the particulate material from the conditioned gas stream received along line 32. A resulting gas stream is discharged at line 46, while the collected particulate material is discharged at point 48 and delivered to the screen deck 14 for screening to be separated between the fuel bin and the former, or disposed. The resulting gas stream is delivered along line 46 to a VOC oxidizer 50 and thereafter to a remote fan 52 and a stack 54 prior to being discharged to the atmosphere.

A portion of the output of the oxidizer 50 may be diverted to a recirculating fan 56 along line 58. The gas stream recirculated along line 58 may be passed through a heater 60, such as one heated by steam and the like, in order to heat the return air to a desired temperature and deliver same along line 36 to a point 38 proximate the mixing chamber. The heated air may be added to the gas stream discharge from the primary separators 6 and 8 in order to increase the temperature of the gas stream. In general, the gas stream discharged from the primary separators 6 and 8 does so at a temperature between 130°–170°. The gaseous compounds and liquid vapor suspended therein cool as the gas stream passes along lines 28 and 32. But for the addition of heated gas along line 36, these compounds and the liquid vapor may cool to the dew point and condense. The heated air is delivered along line 36 to combine with the filtered air at point 38 and within mixing chamber 30 to increase the temperature of the filtered gas stream significantly above the dew point of the compounds and vapor therein. By increasing the temperature of the gas stream in this manner, the inventive system prevents condensation of these undesirable compounds and vapors within the secondary filter 34.

In the above example, the filtered gas stream discharged from the primary separators 6 and 8 may do so at a temperature between 130°–170°. It is preferable to heat the filtered gas stream prior to delivery to the secondary filter 34 to a temperature of at least 40° above dew point in order to prevent condensation. The temperature and volume of air introduced at point 38 into the gas stream will vary dependent upon the system parameters, the air flow volume and temperature of the gas stream and the like. The temperature and volume of the heated air in line 36 is adjusted manually or automatically to ensure that the temperature of the gas stream at the inlet to the secondary filter 34 is above a set level. Optionally, if an automated heat and flow control system is used, a sensor may be provided proximate the inlet and/or the outlet to the secondary filter 34 to monitor the temperature and air flow within line 32. The sensor may deliver its readings to a remote controller which thereafter varies the volume of air passed through the recirculating fan 56 and/or the temperature within the heater 60. In this manner, the gas stream is conditioned to be filtered at a desired temperature.

In addition, the filtered gas stream from the primary separators 6 and 8 is further conditioned at point 42 to ensure that a desired "grain load" exists therein. The term "grain load" is a term of art and refers to the number of dust particles per cubic foot of air flow. The grain load (i.e., dust content per cubic foot of air flow) within line 32 is maintained above a minimum threshold to ensure that the secondary filter 34 operates at an optimal filtering efficiency. By way of example, the secondary filter 34 may represent a baghouse type filtration device having fabric filter media therein. In a baghouse type filtration device, it is desirable to maintain the minimum grain load above a minimum level, such as one grain per cubic foot of air flow. The baghouse type filter is capable of attaining a dust cake upon the surface of the filtration media when the grain load is at or above this minimum level per cubic foot. As explained above, by providing a dust cake upon the filtration media, the filtration efficiency is enhanced and the filters effective life is extended.

The output of the fuel bin 44 is controlled at valve 41 to deliver a minimum amount of secondary particulate material necessary to achieve the desired grain load within the filter 34. As one option, the bin 44 and valve 41 may be set to discharge dust into the line 32 based solely upon the air flow rate through line 32, independent of the percentage content of particulate material within the filtered air stream being discharged from the separators 6 and 8. The maximum grain load capacity of the secondary filter 34 is significantly higher than the minimum grain load delivered at line 40. Hence, the combination of primary particulate material (from line 28) and secondary particulate material (from line 40) will never exceed the capacity of the filter 34. By setting the bin 44 output at the minimum grain load necessary for the filter 34, the optimal filtration efficiency is achieved regardless of the particulate content of the filtered gas stream delivered along line 28.

Optionally, the air flow sensor (33 and/or 35) located at the inlet 39 or outlet of the filter 34 may similarly be utilized to control the valve 41 and the discharge rate of particulate material from the bin 34. Hence, as the air flow rate along line 32 varied, similarly the particulate material discharge rate from bin 44 and valve 41 would vary to ensure the minimum necessary grain load.

FIG. 2 illustrates an alternative embodiment which merely illustrates the portion of the system that has been varied from the embodiment of FIG. 1. The components to the left of line 70 remain the same and are not shown. The steam heater 60 (FIG. 1) may be removed and any other conventionally known form of heat source 72 (FIG. 2) may be introduced to deliver heated air along line 74 to the recirculating fan 56. As in the first embodiment, the heated air is delivered along line 36 to the line 28 proximate the mixing chamber 30 (not shown). As a further option, the mixing chamber 30 may be removed and the heated air may be delivered along line 36 to a position upstream of the fan 73. In this embodiment, the fan 73 would effect sufficient mixing of the heated air from line 36 and the filtered gas stream along line 24, thereby avoiding the need for a separate mixing chamber 30.

FIG. 3 illustrates a further alternative embodiment in which the oxidizer 50 is completely removed and the secondary filter 34 merely delivers the resulting gas stream directly to the atmosphere. As a further option, the particulate material collected in the secondary filter 34 may be delivered to a separate fuel bin 80 for use as fuel in other equipment within the wood processing system. As a further alternative, a bleed-in air fan 82 may be substituted for the recirculating fan 56 and used to deliver air from the heat source 72 to a point downstream of the dryer 2.

The preferred embodiment of the present invention may be varied in several ways, so long as the gas stream discharged from the primary separators is preconditioned prior to being delivered to a secondary filter. Optionally, a single or multiple primary separator may be used.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A gas filtration system comprising:

a primary separator for removing a majority of a primary particulate material from a gas stream and for discharging a filtered gas stream into a primary outlet line which retains an unfiltered portion of said primary particulate material;

a secondary particulate source, communicating with said primary outlet line of said primary separator, for introducing secondary particulate material into said filtered gas stream to produce a conditioned gas stream containing said unfiltered portion of said primary particulate material and said secondary particulate material;

a secondary filter, communicating with said primary outlet line downstream of said secondary particulate source, for removing said unfiltered portion of said primary particulate material and said secondary particulate material from said conditioned gas stream to output a resultant gas stream; and a heat source, located between the primary separator and the secondary filter, for heating the conditioned gas stream at a point along said primary outlet line upstream of said secondary filter.

2. A gas filtration system comprising:

a primary separator for removing a majority of a primary particulate material from a gas stream and for discharging a filtered gas stream into a primary outlet line which retains an unfiltered portion of said primary particulate material;

a secondary particulate source, communicating with said primary outlet line of said primary separator, for introducing secondary particulate material into said filtered gas stream to produce a conditioned gas stream containing said unfiltered portion of said primary particulate material and said secondary particulate material;

a secondary filter, communicating with said primary outlet line downstream of said secondary particulate source, for removing said unfiltered portion of said primary particulate material and said secondary particulate material from said conditioned gas stream to output a resultant gas stream; and a heated gas stream source, communicating with said primary outlet line, for introducing heated gas into the filtered gas stream.

3. A gas filtration system, according to claim 2, further comprising a mixing chamber, within said primary outlet line, for mixing the heated and filtered gas streams upstream of said secondary filter.

4. In a wood drying system having a primary separator for removing particulate material from an output gas stream discharged from the wood dryer and for outputting a filtered gas stream along a primary outlet line, the improvement comprising:

a secondary source attached to said primary outlet line, for adding particulate material to the filtered gas stream to produce a conditioned gas stream;

filter means, attached to a discharge end of the primary outlet line to receive said conditioned gas stream, for filtering particulate material from the conditioned gas stream; and a heat source, located upstream of said filter means, for heating said filtered gas stream.

5. In a wood drying system having a primary separator for removing particulate material from an output gas stream discharged from the wood dryer and for outputting a filtered gas stream along a primary outlet line, the improvement comprising:

a secondary source attached to said primary outlet line, for adding particulate material to the filtered gas stream to produce a conditioned gas stream;

filter means, attached to a discharge end of the primary outlet line to receive said conditioned gas stream, for filtering particulate material from the conditioned gas stream; and a heated gas stream source, communicating with the primary outlet line of the primary separator, for introducing heated gas into the filtered gas stream, and a mixing chamber for mixing the heated and filtered gas streams upstream of said filter means.

6. A method for filtering particulate material from a gas stream, comprising the steps of:

entraining a primary particulate material in a gas stream;

removing a majority of said primary particulate material from the gas stream to form a primary gas stream;

after said removing step, adding secondary particulate material to said primary gas stream to form a conditioned gas stream;

heating the primary gas stream to a filtering temperature above a temperature of said gas stream at said entraining step; and filtering a remaining portion of said primary particulate material and said secondary particulate material from said conditioned gas stream.

7. A method for filtering particulate material from a gas stream, comprising the steps of:

entraining a primary particulate material in a gas stream, said particulate material comprising wood particles;

drying the particulate material in a wood dryer;

removing a majority of said primary particulate material from the gas stream to form a primary gas stream;

after said removing step, adding secondary particulate material to said primary gas stream to form a conditioned gas stream including gaseous by-products;

after said adding step, filtering a remaining portion of said primary particulate material and said secondary particulate material from said conditioned gas stream; and raising a temperature of the conditioned gas stream a predefined amount above a condensation temperature of the by-products, prior to the filtering step, to prevent condensation of the by-products during the filtering step.

8. A method for filtering particulate material from a gas stream, comprising the steps of:

entraining a primary particulate material in a gas stream;

removing a majority of said primary particulate material from the gas stream to form a primary gas stream;

after said removing step, adding secondary particulate material to said primary gas stream to form a conditioned gas stream;

adding heated gas to the gas stream to raise a temperature of the gas stream to a predefined level; and filtering a remaining portion of said primary particulate material and said secondary particulate material from said conditioned gas stream.

* * * * *